United States Patent

[11] 3,565,252

| [72] | Inventors | James J. Sheehy<br>Rockville Centre, N.Y.;<br>Peter A. Sait, Surbiton, England |
|---|---|---|
| [21] | Appl. No. | 797,216 |
| [22] | Filed | Feb. 6, 1969 |
| [45] | Patented | Feb. 23, 1971 |
| [73] | Assignee | Esso Research and Engineering Company |
| [32] | Priority | Feb. 9, 1968 |
| [33] | | Great Britain |
| [31] | | 6,576 |

[54] OIL WATER SEPARATION SYSTEM FOR TANKERS
5 Claims, 1 Drawing Fig.

[52] U.S. Cl. .................................................. 210/104,
210/110, 210/119, 210/254, 210/258, 210/259,
210/195, 210/197
[51] Int. Cl. ...................................................... B01d 21/10

[50] Field of Search........................................... 210/86,
104, 110, 119, 254, 257, 258, 259, (C.D. Digest),
195, 197

[56] References Cited
UNITED STATES PATENTS

| 646,931 | 4/1900 | Greer | 210/86X |
|---|---|---|---|
| 1,186,220 | 6/1916 | Morris | 210/86 |
| 2,018,757 | 10/1935 | Butterworth | 210/257X |
| 3,223,244 | 12/1965 | Topol et al. | 210/247 |
| 3,339,736 | 9/1967 | Muller | 210/104 |
| 3,425,556 | 2/1969 | Volker | 210/104 |

*Primary Examiner*—John Adee
*Attorneys*—Manahan and Wright and Donald F. Wohlers ABSTRACT: In a system for handling tank washings for oil tankers, means for separating oil from water are provided to assure that water passing overboard will not have present therein oil in excess of a predetermined concentration.

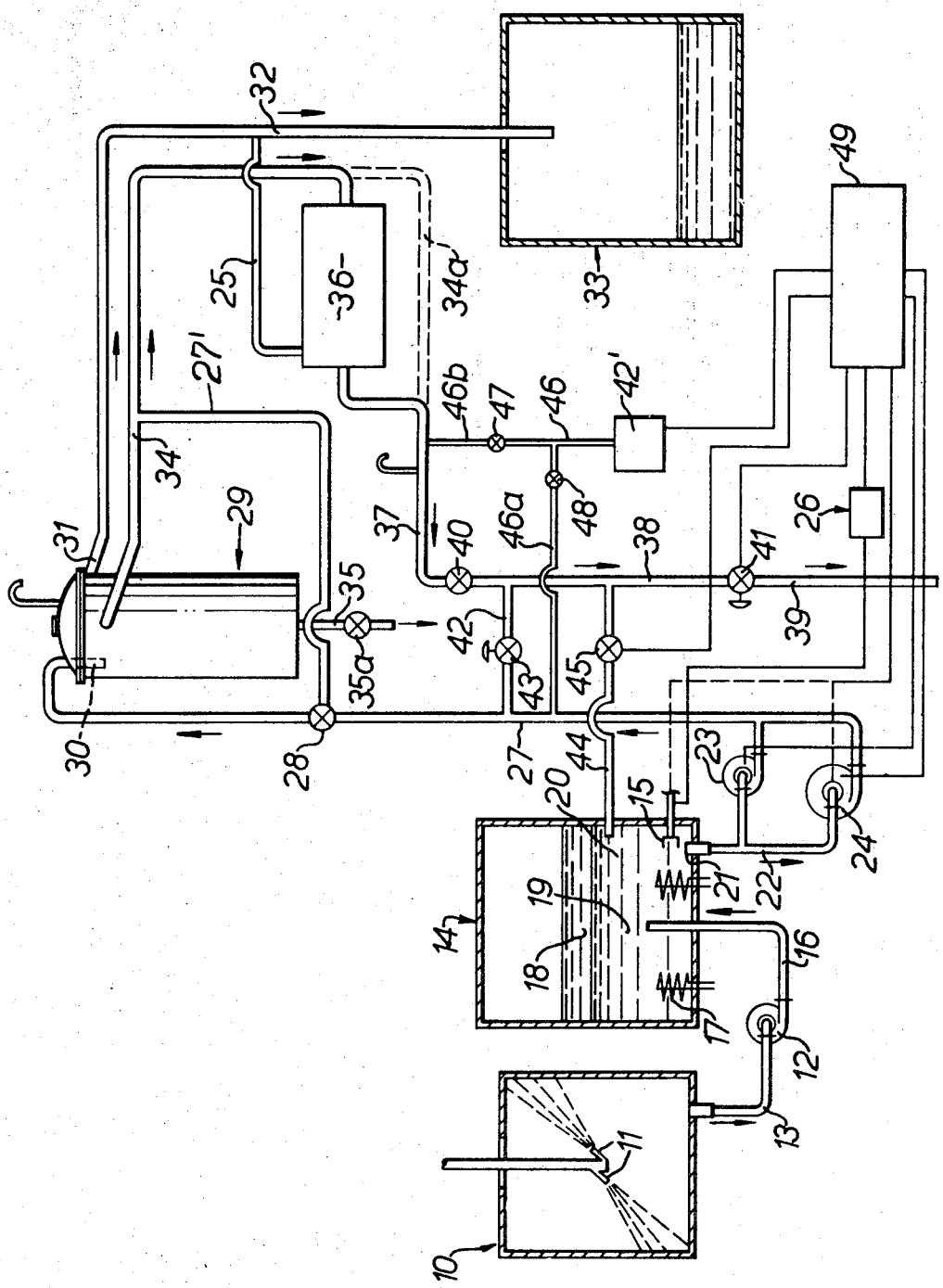
INVENTOR
JAMES J. SHEEHY
PETER A. SAIT
Donald F. Wohlers ATTORNEY

OIL WATER SEPARATION SYSTEM FOR TANKERS

Pumping means consisting of first, a high capacity pump and alternatively, a second low capacity pump, to remove water which has settled to the bottom of a tank. The high or low capacity pump is deactivated by an oil/water interface sensor.

In recent years considerable attention has been directed toward preventing pollution of the seas. Oil tankers in particular face the problem since, after discharging their oil cargo, some of the cargo tanks must be partially filled with sea water to maintain vessel stability during the next voyage to a loading port. In order to receive cargo the ballast water must be discharged at the loading port, either into shore tanks or into harbor waters. All ports require that ballast water must be free of polluting contaminants if pumped overboard in harbor areas and as shore tanks are not normally available to receive ballast many tanker operators thoroughly wash certain of the cargo tanks at sea by means of a rotating nozzle device and reballast the vessel with clean sea water.

Alternatively, unwashed cargo tanks may be loaded with sea water ballast particularly since the discharging separation system of the present invention permits the handling of sea water ballast contaminated with oil. In an unwashed cargo tank containing ballast water the oil in the water will float upward during the voyage forming a thin stratum of oil and water clean enough to discharge directly overboard, comprising the bulk of the ballast, will settle in the lower part of the tank. Intermediate the oil stratum and the clean water is a relatively small region wherein there is water containing oil in excess of the concentration permitted to be discharged into harbor waters. Thus, as an alternative to the washing of ballast tanks, the bulk of ballast water received into unwashed cargo tanks may be passed directly overboard at the loading port and the stratum of oil and the region of water containing excess oil retained on board for further separation of the oil and water.

By international agreement it is permissible to discharge the tank washings and oily ballast water into certain ocean areas. However, most maritime nations are today encouraging their national flag shipowners to desist entirely from the overboard discharge of tank washings or ballast water containing persistent oil in the interests of reducing pollution of the seas. The present invention is directed to the removal and recovery of oil contaminants present in tank washing residues, engine room bilge waters, vessels' oily ballast waters or any oil contaminated effluents originating ashore or afloat where the contamination factor has a different specific gravity than the containing liquid.

According to the present invention, in a tanker the residue from washing the cargo tanks or the oily ballast water retained on board is sent to a collecting tank. Pumping means consisting of first, a high capacity pump and alternatively, a second low capacity pump, remove the water which has settled to the bottom of the tank. The high capacity pump (or sometimes only the low capacity pump if slower pumping is required) may be used for direct discharge of such settled water overboard from the collecting tank during a process commonly referred to as decanting. The high or low capacity pump is deactivated by an oil/water interface sensor which substantially reduces the risk of discharging contaminated water during decanting. If the high capacity pump is used first, ordinarily, the low capacity pump subsequently is operated to direct the remaining collected liquid to a separator which separates the oil from the water before the latter is permitted to pass overboard. An oil/water detector and associated conduit means cooperate to shunt mixtures of oil/water back to the settling tank when the separated water contains above a preselected concentration of oil.

Attention is invited to the following description of a preferred embodiment of the invention and to the accompanying drawing in which there is shown a schematic representation of the various parts of the oil/water separation system, including tanks, separation means, and cooperative valving, pumping and oil/water sensing and detecting apparatus.

Referring to the drawing, reference number 10 indicates a tank such as one of several cargo tanks of a tanker being washed by the application of high velocity jet streams of water from a nozzle 11. A stripping pump 12 removes the tank washings as an oil/water mixture or emulsion (hereinafter referred to collectively and generically as a "mixture") from the tank 10 by means of conduit 13 directing the tank washings to a collecting tank 14 through conduit 16. The collecting tank may be equipped with heater coils 17 to assist the gravity separation of oil from water.

Free oil will form a layer 18 at the top of the fluid mass within the collecting tank and a mixture 19, consisting of water containing a very small quantity of oil in the form of minute droplets, of oil will settle to the bottom of the tank. Intermediate the layers 18 and 19 is an oil rich transition region 20 wherein the concentration of oil in water increases to a marked degree. It will be understood that water settling most adjacent to the bottom of tank 14 will contain very little oil, whereas, the concentration of oil in the water in transition region 20 will increase as the oil layer 18 is approached.

At the bottom of the tank 14 is an outlet 21 connected to a removal conduit 22, the latter leading to a low capacity pump 23 and a higher capacity pump 24 which may, under ordinary circumstances, consist respectively of a stripping pump and a main cargo pump aboard the tanker. Pumps 24 and 23 are controlled in part by an oil/water interface sensor 26, for a purpose which will subsequently be described.

Leading from each of the respective pumps 23 and 24 is a conduit 27 in which a three-way valve 28 is positioned and which leads directly to an oil/water separator 29. A line 27' connects the valve 28 directly to line 34 to bypass the separator and to send effluent directly to a coalescer 36 whenever the presence of contaminating oil is insufficient (e.g., 1,000 parts per million) to require treatment by both the separator and coalescer. The valve 28 is of conventional design, adapted to be manually actuated, for example, or by pneumatic, hydraulic or electrical means (not shown), in one of three positions. The separator 29 has an inlet 30 for the admission to the separator of mixtures of oil and water and has an oil outlet 31 connected to the conduit 32 for carrying oil removed from oil/water mixtures from the separator to an oil collecting tank 33. A line 35 and valve 35a are provided for draining liquid or for the removal of collected solids from the separator 29.

Water from which most of the oil has been separated leaves the separator 29 by means of conduit means 34 flowing to a second oil/water separation unit 36. The latter, for example, may operate primarily on a coalescing principle whereby very fine droplets of oil still remaining in the effluent from the separator 29 will be removed so that the amount of oil with respect to the water passing from the unit is below a given concentration. Separated oil will pass through line 25 to conduit 32 and therefrom to recovery tank 33. Alternatively when the second oil/water separator 36 is not necessary to obtain the desired degree of water purification, it may be omitted and the water from the first separator 29 flows by conduit means 34a directly to conduit 37.

On the water outlet side of the coalescer unit 36 there is an outlet system consisting of conduits 37, 38 and 39 in which are located two-way control valves 40 and 41. The latter two valves, when open, permit water effluent to flow from the coalescer 36 overboard from the vessel through conduits 38 and 39. Preferably, valve 41 is pneumatically or hydraulically actuated, whereas valve 40 may be manually actuated.

A conduit 42 with a two-way control valve 43 therein interconnects conduits 27 and 38. Conduit 44 with two-way valve 45 therein connects conduit 38 with the collecting tank 14. Valve 45 preferably is adapted to be actuated by pneumatic or hydraulic pressure. Alternatively there may be substituted for two-way valves 41 and 45 a single three-way valve (not shown) which will shunt the water from conduit 38 either to conduit 39 or conduit 44. Such three-way valve preferably is adapted to be actuated by pneumatic or hydraulic pressure. In order to assure that water passing overboard from the separator 29 or the coalescer 36 does not contain oil in excess of a preselected concentration, the invention provides means for detecting concentrations of oil above a prescribed maximum. Accordingly conduits 27 and 37 are connected respectively to the inlet line 46 of an oil-in-water detector 42 by sampling lines 46a and 46b. Flow through sampling lines 46a and 46b respectively are controlled by two-way manually actuated valves 48 and 47 so that samples of the water flowing in either conduit 27 or conduit 37 may be sent to the detector 42. Alternatively there may be substituted for two-way valves 47 and 48 a single three-way valve (not shown) which will pass water samples from either conduit 27 or conduit 37 to the detector 42'.

The detector 42' may be of the type manufactured by Bailey Meters and Controls, Ltd., Croyden, England. Such detector has a readiation source and in a transparent medium such as water will irradiate and cause fluorescence of oil droplets. Through the operation of a photoelectric sensor, an electrical signal is generated proportional to the fluorescence produced which therefore can be calibrated to provide a measure of oil concentration in the water medium.

As shown in the drawing, the signal from the detector 42' may be sent to a receiver-controller 49 which in response thereto will cause actuation of valves 41 and 45. Thus, as will be more fully described, if the detector 42' senses a concentration of oil in the water passing through sampling line 46a, greater than a preselected maximum (e.g., 100 parts per million), the output signal of the detector 42', by operation of receiver-controller 49, will effect actuation to valve 41 of its closed position and of valve 45 to its open position, preventing the flow of liquid overboard and permitting the flow of liquid to the collecting tank 14.

The interface sensor 26 also generates an electrical signal which again, being transmitted to receiver-controller 49 will cause the latter to deactivate either of the pumps 23 or 24 which may be operating to decant tank 14. The interface sensor 26 may be, for example, of the type designated Model 400-S manufactured by Marine Moisture Control Company, Inc., Inwood, N.Y. The sensor has a probe 15 defining a gap which will be filled with the fluid in collecting tank 14. An ultrasonic signal is sent across the gap which will vary in accordance with the physical characteristics of different liquids in the gap. The sensor may be set to produce no electrical signal output for fluids containing prescribed minimum concentrations of oil and to produce an output signal, for example of 115-volts AC 60 C.P.S. at 10 Amps when the physical characteristics of the fluid change drastically, as would occur accompanying a change from water to oil. Thus, the sensor 26 can detect the presence of a relatively large concentration of oil which is present in the transition region 20 and in response thereto the sensor can deactivate the pump decanting tank 14. The probe 15 of sensor 26 is installed in tank 14 at a predetermined height above outlet 21 so that upon the sensing of a high concentration of oil in the water at the level of the probe the pump decanting tank 14 is deactivated before an appreciable quantity of oil is drawn into outlet 21.

The operation of the foregoing system will now be described. Under ordinary circumstances during the washing of respective cargo tanks, the washings therefrom will be removed by means of stripping pumps (by stripping pump 12 in respect of cargo tank 10, as shown) and the washings would be deposited in the collecting tank 14. The tank 14 may have, for example, a capacity of 2000 tons. When the tank 14 is relatively filled and after a settling period has passed, for instance about four hours, during which separation of the oil and water may be facilitated by applying heat by means of heating coils 17 and by treating the washings with a chemical demulsifier such as Breaxit 7941, manufactured by Enjay Chemical Company, Houston, Tex., the major portion of the fluid contained in the tank 14 will consist of water having less than, say, a prescribed maximum of 100 parts per million of oil. This water is naturally found at the lower levels of the tank and may, according to the system and control features of the present invention, be removed and sent directly overboard at a relatively high rate without pollution of the seas by oil. This direct passage of settled water is known as decanting.

Accordingly, the first operation or series of similar operations which will be performed using the disclosed system will be decanting. During this operation, valves 28, 40, 45 and 47 will be closed, while valves 43, 41 and 48 will be open. Cargo pump 24 will be ordinarily energized (but sometimes alternatively pump 23) and will draw the water which has settled to the bottom of the tank 14 therefrom and will pass this water overboard through conduits 22, 27, 42, 38, and 39.

Cargo pump 24 may have a pumping capacity of 2500 tons per hour, and consequently there is the danger that if the detector 42' is relied upon to deactivate cargo pump 24, relatively large quantities of higher concentration oil in water will have already passed into the conduit system before such is sensed by the detector 42'. Consequently, the interface sensor 26 sensing the imminence or presence of a high concentration of oil in the water at the level of probe 15 will deactivate the cargo pump before such water of high oil content reaches the outlet of tank 14. When the cargo pump 24 has thus been deactivated, valves 43 and 48 may be closed manually and valves 28, 40, and 47 opened. At the same time, stripping pump 23 will be energized and for the remainder of the operation, liquid removed from the tank 14 will pass to the separator 29.

Before proceeding with a description of this further operation, it should be said that the detector 42' will, during the decanting operation sense the presence of oil in the water being pumped through the conduit 27. If the concentration of oil exceeds the preselected maximum, detector 42' will send a signal to the receiver controller 49 to effect closing of valve 41 and simultaneous opening of valve 45. By this means, the liquid, instead of passing through valve 41 and overboard, will be returned through conduit 44 to the collecting tank 14. At this point cessation of water passing overboard (or a visible or audible signal, not shown, activated by receiver controller 49) will provide notice that cargo pump 24 should be deactivated manually, that valves 28, 40 and 47 should be opened, and valves 43 and 48 closed.

Stripping pump 23 may then be energized to send further liquid from tank 14 to the separator 29 at a rate within the capability of the separator to separate the oil and water. Oil removed by the separator will pass therefrom to outlet 31 and conduit 32 to the recovery tank 33. The water effluent, with greatly reduced oil therein passes by means of conduit 34 to the coalescer 36. Effluent from the coalescer at less than the prescribed maximum concentration of oil, such as less than 100 parts per million, will pass from the coalescer 36 through the conduit 37 and into conduit 38. The detector 42 will quickly sense the effluent from the coalescer 36 is clean enough to pass overboard and, as a result, receiver-controller 49 will effect actuation of valve 41 to its open position and of valve 45 to its closed position.

So long as the effluent from coalescer 36 remains low in oil concentration, valve 41 will remain open and valve 45 closed. However, should a concentration of oil in excess of the prescribed maximum be detected, the detector 42 will again send its electrical signal to receiver-controller 49 which reverses the positions of valves 41 and 45, thus preventing passage overboard of contaminated water and the return thereof to the collecting tank 14.

It will be usual for the various cargo tanks to continue to be washed during the ballast leg of the voyage and the washings sent to the collecting tank 14 for a succession of decanting and/or separation runs through the separator and coalescer in accordance with the controls described. Eventually, all of the tank washings will have been sent to the collecting tank 14 and all of the liquid therein shall have passed through the system and the oil which has been separated shall have been collected in the recovery tank 33. Due to the controls provided and their respective interplay, at no time should water which contains contamination above, for example, 100 per million of oil, be passed overboard.

Although the above system has been described wherein tank washings are collected and separated into components, the invention is equally applicable to the separation of dirty ballast water. That is, under certain circumstances, water may be taken aboard ship for ballast purposes and pumped into unwashed or dirty ballast tanks directly. The water thus contaminated may be treated in the described manner with respect to tank washings.

It will be understood that the foregoing description is representative in the sense that it has referred to a preferred embodiment of the invention. In order to appreciate more fully the scope of the invention, attention is invited to the appended claims.

We claim:

1. A system capable of handling a mixture of two immiscible liquids having different densities, such as for example, oil and water, for separating the water for disposal as waste and the oil for retention when the oil is present in the mixture in excess of a predetermined concentration comprising, a tank adapted to receive said mixture, separator means for separating said liquids, pump means operably connected with said tank for withdrawing said mixture from said tank, a waste disposal outlet, first conduit means connecting said pump means to said separator means for separation of said liquids, second conduit means arranged to bypass the separating means and for connecting said pump means to said waste disposal outlet, first valve means operably associated with said waste disposal outlet for controlling flow therefrom, third conduit means with said waste disposal outlet connected for providing a return flow to said tank when said first valve means is disposed so as to shut off flow from said waste disposal outlet, fourth conduit means for operably connecting the separating means to said waste disposal outlet, second valve means operably disposed in said third conduit means for controlling flow therethrough, third valve means operably disposed in said first conduit means for controlling flow from said pump means to said separator means, control means including sensing means operably connected for detecting the concentration of oil present in the liquid flow passing from at least one of said pump means and said separator means, and being further connected with said first valve means, whereby said first valve means is operable in response to the oil concentration detected by said sensing means whereupon said first valve means will be disposed to shut off flow therethrough whenever the oil present in the liquid flow to said waste disposal outlet exceeds said predetermined concentration.

2. The system according to claim 1 wherein said tank is adapted to contain a quantity of said oil and water for gravity separation thereof, there being successive layers comprising water, an oil/water mixture forming an interface and oil, said control means including a sensing probe located in said tank at a distance above the bottom thereof for detecting oil concentrations in said interface above said predetermined concentration, means connecting said control means to said pump means for deactivating said pump means when the probe senses an oil concentration in the interface above said predetermined concentration.

3. The system according to claim 2 in which said pump means comprises two pumps of different capacities, said control means being operably connected to at least the pump of greater capacity so that when said probe senses an excessive oil concentration said pump of greater capacity will be deactivated.

4. The system according to claim 2 wherein said sensing means is operably connected to detect the presence of an excessive concentration of oil in the output flow from said pump means and said control means is operably connected with said first valve means and said second valve means for shutting off said first valve means and opening said second valve means thereby preventing disposal of water having an excessive oil concentration and causing said flow to return to said tank.

5. The system according to claim 2 wherein said separator means includes an oil outlet and a water outlet, and a tank adapted for collecting oil is operably connected with said oil outlet, said separator means further includes a coalescer operably connected to said water outlet of said separation mean, said coalescer having an oil outlet operably connected to said collecting tank and a water outlet connected to said waste disposal outlet.